(12) United States Patent
Lin et al.

(10) Patent No.: US 10,747,840 B2
(45) Date of Patent: Aug. 18, 2020

(54) METHOD FOR BROWSING VIRTUAL REALITY WEBPAGE CONTENT AND ELECTRONIC DEVICE USING THE SAME

(71) Applicant: Acer Incorporated, New Taipei (TW)

(72) Inventors: Shih-Hao Lin, New Taipei (TW); Chao-Kuang Yang, New Taipei (TW); Wen-Cheng Hsu, New Taipei (TW); Chih-Sheng Chen, New Taipei (TW); Siang-Jyun Cheng, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/215,906

(22) Filed: Dec. 11, 2018

(65) Prior Publication Data

US 2019/0205357 A1    Jul. 4, 2019

(30) Foreign Application Priority Data

Dec. 29, 2017    (TW) .............................. 106146362 A

(51) Int. Cl.
*G06F 16/957* (2019.01)
*G02B 27/01* (2006.01)
*G06F 3/0481* (2013.01)

(52) U.S. Cl.
CPC ....... *G06F 16/9577* (2019.01); *G02B 27/017* (2013.01); *G06F 3/04815* (2013.01); *G06F 16/957* (2019.01)

(58) Field of Classification Search
CPC ............... G06F 16/9577; G06F 16/957; G06F 3/04815; G02B 27/017
See application file for complete search history.

(56) References Cited

U.S. PATENT DOCUMENTS

| | | | |
|---|---|---|---|
| 8,533,580 B1 * | 9/2013 | Xu ...................... | G06F 3/04815 715/205 |
| 9,262,396 B1 * | 2/2016 | Rodriguez Valadez ..................... | G06F 11/3684 |

(Continued)

FOREIGN PATENT DOCUMENTS

| | | | |
|---|---|---|---|
| CN | 106200974 | * | 12/2016 |
| CN | 106200974 A | | 12/2016 |

(Continued)

OTHER PUBLICATIONS

Author Unknown, "Introduction to the WebVR API," URL: https://developer.oculus.com/documentation/oculus-browser/latest/concepts/browser-webvr-api/, Dec. 9, 2016, pp. 1-4.

*Primary Examiner* — Mandrita Brahmachari
(74) *Attorney, Agent, or Firm* — Birch, Stewart, Kolasch & Birch, LLP

(57) ABSTRACT

A method for browsing virtual reality (VR) webpage content is provided. The browsing method includes: identifying a device information of a VR helmet by a native application; sending out a notification message by a first browser when it is detected that a VR webpage is browsed; retrieving a webpage information corresponding to the VR webpage and providing the webpage information to the native application by an extension component of the first browser in response to the notification message; determining, by the native application, whether the first browser supports the VR helmet to display a VR content of the VR webpage according to the device information; opening the VR webpage through a second browser, which supports the VR helmet to display the VR content, by the native application according to the webpage information when it is determined that the first browser does not support the VR helmet.

18 Claims, 4 Drawing Sheets

(56) References Cited

U.S. PATENT DOCUMENTS

| | | | |
|---|---|---|---|
| 10,025,941 B1* | 7/2018 | Griffin | G06F 21/6209 |
| 2010/0218106 A1 | 8/2010 | Chen et al. | |
| 2011/0022571 A1* | 1/2011 | Snyder | G06F 8/62 |
| | | | 707/692 |
| 2012/0210119 A1* | 8/2012 | Baxter | H04L 63/08 |
| | | | 713/150 |
| 2013/0282755 A1* | 10/2013 | Procopio | G06F 9/44505 |
| | | | 707/770 |
| 2016/0142264 A1* | 5/2016 | Sahi | H04L 12/42 |
| | | | 370/254 |
| 2017/0104928 A1 | 4/2017 | Chase et al. | |
| 2018/0047108 A1* | 2/2018 | Silverstone | G06F 3/0482 |

FOREIGN PATENT DOCUMENTS

| | | |
|---|---|---|
| TW | 449707 B | 8/2001 |
| WO | WO 01/88679 A2 | 11/2001 |

* cited by examiner

METHOD FOR BROWSING VIRTUAL REALITY WEBPAGE CONTENT AND ELECTRONIC DEVICE USING THE SAME

This application claims the benefit of Taiwan application Serial No. 106146362, filed Dec. 29, 2017, the subject matter of which is incorporated herein by reference.

BACKGROUND OF THE INVENTION

Field of the Invention

The disclosure relates in general to a method for browsing virtual reality (VR) webpage content and an electronic device using the same.

Description of the Related Art

There are many virtual reality (VR) helmets on the market that can be used to browse the content of VR webpages (such as WebVR). However, the browsers supported by various VR helmets are different. If a user wants to experience a VR webpage, he/she has to firstly know which browser his/her VR helmets supports. Therefore, it often happens that users don't know how to choose the browser or they have to use a browser that they are not familiar with to use their VR helmet. This not only increases the complexity of the operation, but also reduces user's pleasure in browsing the VR webpage.

SUMMARY OF THE INVENTION

The present disclosure relates to a method for browsing virtual reality (VR) webpage content and an electronic device using the same. According to the browsing method and the electronic device using the same of the present disclosure, the user's VR helmet type is automatically detected, and the browsers supported by the VR helmet are automatically found out. When it is determined that the user's current browser does not support the VR helmet to display the VR content of the VR webpage, the VR content is automatically switched to be displayed by the browser which supports the VR helmet. Thus, even when the user does not know what browsers his/her VR helmet can support or is not familiar with the operation of the browsers supported by the VR helmet, the user still can conveniently browse the VR content of the VR webpage by using his/her familiar browser.

According to one embodiment the present disclosure, a method for browsing virtual reality (VR) webpage content is provided. The browsing method includes the following steps. Device information of a VR helmet is identified by a native application. A notification message is sent out by a first browser when it is detected that a VR webpage is browsed. In response to the notification message, webpage information corresponding to the VR webpage is retrieved and the webpage information is provided to the native application by an extension component of the first browser. It is determined by the native application whether the first browser supports the VR helmet to display a VR content of the VR webpage according to the device information. The VR webpage is opened through a second browser by the native application according to the webpage information when it is determined that the first browser does not support the VR helmet to display the VR content of the VR webpage. The second browser supports the VR helmet to display the VR content of the VR webpage.

According to another embodiment the present disclosure, an electronic device is provided. The electronic device includes a memory and a processor. The memory stores at least one instruction. The processor is coupled to the memory for executing the at least one instruction to perform the following operations. Device information of a VR helmet is identified by a native application. A notification message is sent out by a first browser when it is detected that a VR webpage is browsed. Webpage information corresponding to the VR webpage is retrieved and the webpage information is provided to the native application by an extension component of the first browser in response to the notification message. It is determined, by the native application, whether the first browser supports the VR helmet to display the VR content of the VR webpage according to the device information. The VR webpage is opened through a second browser by the native application according to the webpage information when it is determined that the first browser does not support the VR helmet to display the VR content of the VR webpage. The second browser supports the VR helmet to display the VR content of the VR webpage.

The above and other aspects of the disclosure will become better understood with regard to the following detailed description of the preferred but non-limiting embodiment (s). The following description is made with reference to the accompanying drawings.

DETAILED DESCRIPTION OF THE INVENTION

The present disclosure relates to a method for browsing virtual reality (VR) webpage content and an electronic device using the same. The VR content of the VR webpage can be, for example, a webpage with VR content such as the webpage content provided by using the Web VR technology. The user can browse the VR content of the VR webpage by using a browser and wear the VR helmet supported by the browser to enjoy the VR content of the VR webpage.

The method for browsing VR content of the VR webpage of the present disclosure can be performed by an electronic device. The electronic device includes a memory and a processor. The memory stores at least one instruction. The processor is coupled to the memory for executing the at least one instruction to perform the method for browsing VR content of the VR webpage of the present disclosure. The processor can be, for example, a microcontroller, a microprocessor, a digital signal processor, an application specific integrated circuit (ASIC), a digital logic circuit, a field programmable gate array (FPGA), or other hardware component with computation and processing function. The method for browsing VR content of the VR webpage of the present disclosure can be implemented by a software program stored in a non-transitory computer readable storage medium, such as a hard disc, an optical disc, a flash drive, or a memory. The processor can load in a software program from a non-transitory computer readable storage medium to perform the method for browsing VR content of the VR webpage of the present disclosure.

Figure 1:
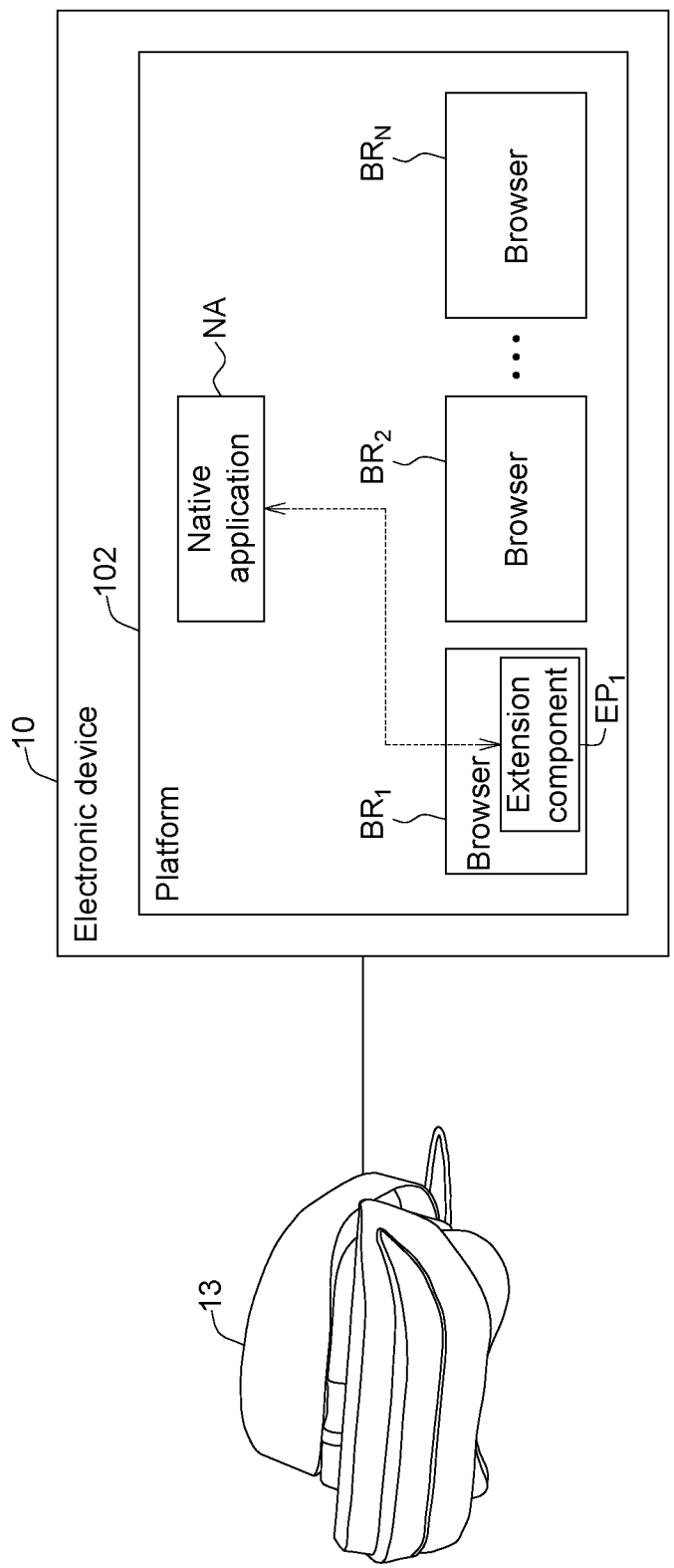
FIG. 1 is a block diagram of an electronic device according to an embodiment of the present disclosure.

FIG. 1 is a block diagram of an electronic device 10 according to an embodiment of the present disclosure. The electronic device 10 is, for example, a laptop, a personal computer, a PC tablet, or a portable electronic device. The VR helmet 13 refers to any head-mounted VR display device which can be connected to the electronic device 10 through a wired connection (such as USB slot) or a wireless connection (such as Bluetooth, WiFi or other wireless communication protocol). The user can operate the electronic device 10 to browse the VR content of the VR webpage and wear the VR helmet 13 to view the VR content of the VR webpage.

The electronic device 10 has a platform 102 which can be, for example, a Windows operating system (OS), an Android operating system, an iOS operating system, a Mac operating system or other existing or customized operating system. The platform 102 has a native application NA of platform and N browsers $BR_1 \sim BR_N$, wherein N is a positive integer. The native application NA is, for example, a software development kit (SDK) provided by the manufacturer of the platform 102 or a software development solution suggested by the manufacturer. If the platform 102 is the Windows operating system, the native application can be, for example, a Win 32/64 application. The browsers $BR_1 \sim BR_N$ can be any forms of webpage content browsers, such as Google Chrome, Chromium, Microsoft Edge, Firefox, or Oculus. Corresponding extension component can be installed in one or more than one of the browsers $BR_1 \sim BR_N$. Taking FIG. 1 for example, the browser $BR_1$ has a corresponding extension component $EP_1$. If the browser $BR_1$ is Google Chrome, the extension component $EP_1$ is a Chrome extension component.

Figure 2:
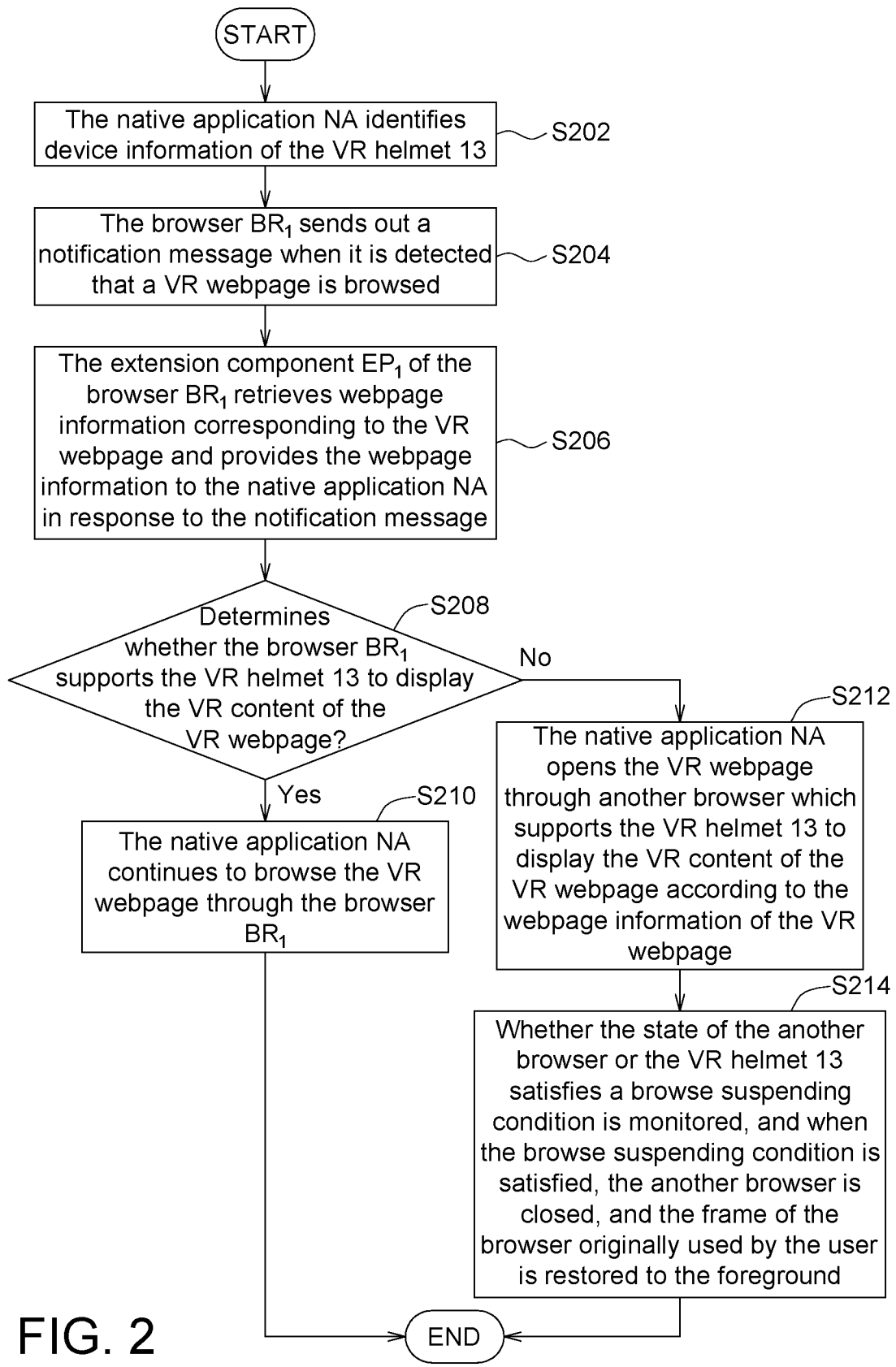
FIG. 2 is a flowchart of a method for browsing VR content of the VR webpage according to an embodiment of the present disclosure.

FIG. 2 is a flowchart of a method for browsing VR content of the VR webpage according to an embodiment of the present disclosure. The method for browsing VR webpage content can be performed by using the electronic device 10 of FIG. 1. It should be noted that the steps of the browsing method are not necessarily performed according to a described order (or any specific order). Besides, the steps of the browsing method disclosed in the present disclosure can be performed in series or in parallel.

In step S202, the native application NA identifies device information of the VR helmet 13. For example, when the VR helmet 13 is connected to the electronic device 10 through a wired connection or a wireless connection, the native application NA starts to identify the VR helmet 13. The device information of the VR helmet 13 can be any information regarding the device type or model of the VR helmet 13. In an embodiment, the device information of the VR helmet 13 includes a product ID and a vendor ID of the VR helmet 13. After identifying the device information of the VR helmet 13, the native application NA further records the device information for the reference of future identification.

In step S204, the browser $BR_1$ sends out a notification message when it is detected that a VR webpage is browsed. For example, when the user browses a VR content of the VR webpage by the browser $BR_1$, the browser $BR_1$ triggers a VR display event and sends out a corresponding notification message.

In step S206, the extension component $EP_1$ of the browser $BR_1$ retrieves webpage information corresponding to the VR webpage and provides the webpage information to the native application NA in response to the notification message. The extension component $EP_1$ can register the VR display event with the browser $BR_1$ in advance to receive the notification message from the browser $BR_1$.

In some situations, the extension component $EP_1$ may be prohibited from directly retrieving the webpage information of the VR webpage due to the consideration of system security. Meanwhile, the native application NA and the extension component $EP_1$ can be registered in the platform 102 to allow the extension component $EP_1$ to retrieve the webpage information of the VR webpage and provide the webpage information to the native application NA.

In an embodiment, when the extension component $EP_1$ receives the notification message, the extension component $EP_1$ displays an operable inquiry window on the frame of monitor to inquire whether the user enters a VR immersive operation. If the user confirms that he/she would like enter the immersive operation, the extension component $EP_1$, in response to the confirmation operation on the inquiry window, provides the webpage information of the VR webpage to the native application NA. The webpage information includes a website of the VR webpage (such as a uniform resource locator (URL)) and webpage content (such as codes of the VR content of the VR webpage).

In step S208, the native application NA determines whether the browser $BR_1$ supports the VR helmet 13 to display the VR content of the VR webpage according to the device information of the VR helmet 13.

In an embodiment, the native application NA obtains a mapping table, which indicates a number of VR helmet types supported by various browsers on different platforms. The native application NA further compares the device information of the VR helmet 13 with the mapping table to find out a browser, which supports the VR helmet 13 to browse the VR webpage, from the mapping table. The mapping table can be stored in the electronic device 10 or in a cloud space.

The mapping table may, for example, include the following content listed in Table 1:

TABLE 1

| | Browser | | |
|---|---|---|---|
| Platform | Chromium | Microsoft Edge | Firefox |
| Windows | VIVE, Oculus | Windows Mixed Reality | VIVE, Oculus |
| Android | Daydream, Cardboard | No device supporting this OS | No device supporting this OS |
| iOS | No device supporting this OS | No device supporting this OS | No device supporting this OS |
| Mac | No device supporting this OS | No device supporting this OS | VIVE |

As indicated in Table 1, when the native application NA identifies that the VR helmet 13 connected to the electronic device 10 is a Windows mixed reality VR helmet, it can be determined that the browser Microsoft Edge can support the VR helmet 13 to display the VR content of the VR webpage on the Windows platform.

It should be noted that the content of Table 1 is merely an embodiment for explaining the present disclosure, not for limiting the present disclosure. The information of Table 1 can be adjusted according to actual compatibility of the browser and/or the VR helmet. Also, the browsers, the platforms and the types and quantities of the VR helmet as indicated in Table 1 are not restrictive. The content of the mapping table can be adjusted according to the product information of the VR helmet and the browser information that have been published or is to be published.

If the result of the determination in step S208 is Yes, that is, it is determined that the browser $BR_1$ supports the VR helmet 13 to display the VR content of the VR webpage, the method proceeds to step S210, in which the native application NA continues to browse the VR webpage through the browser $BR_1$.

If the result of the determination in step S208 is No, that is, it is determined that the browser $BR_1$ does not support the VR helmet 13 to display the VR content of the VR webpage, the method proceeds to step S212, in which the native application NA opens the VR webpage through another browser (such as browser $BR_2$), which supports the VR helmet 13 to display the VR content of the VR webpage, according to the webpage information of the VR webpage. The native application NA can further send out a message to the extension component $EP_1$ for informing that the display window of the browser $BR_1$ can be hidden.

In step S214, during the period in which the VR webpage is browsed by the another browser (that is, the browser which supports the VR helmet 13), whether the state of the another browser or the VR helmet 13 satisfies a browse suspending condition is monitored by a monitoring program (such as a watch dog). When the browse suspending condition is satisfied, the another browser is closed, and/or the frame of the browser originally used by the user (such as browser $BR_1$) is restored to the foreground, such that the user can use his/her familiar browser again. The browse suspending condition includes browsing the VR webpage is terminated and the VR helmet 13 is turned off or enters a sleep mode.

Through the above method, even the user does not know which browsers his/her VR helmet 13 supports or is not familiar with the browsers supported by the VR helmet 13, the user still can conveniently browse the VR content of the VR webpage by using his/her familiar browser (such as browser $BR_1$). Moreover, after the user finishes browsing the VR webpage, the electronic device 10 can automatically switch the browser (such as browser $BR_2$) back to the browser originally operated by the user (such as browser $BR_1$), so the user will not be forced to operate the browser that he/she is not familiar with.

Figure 3:
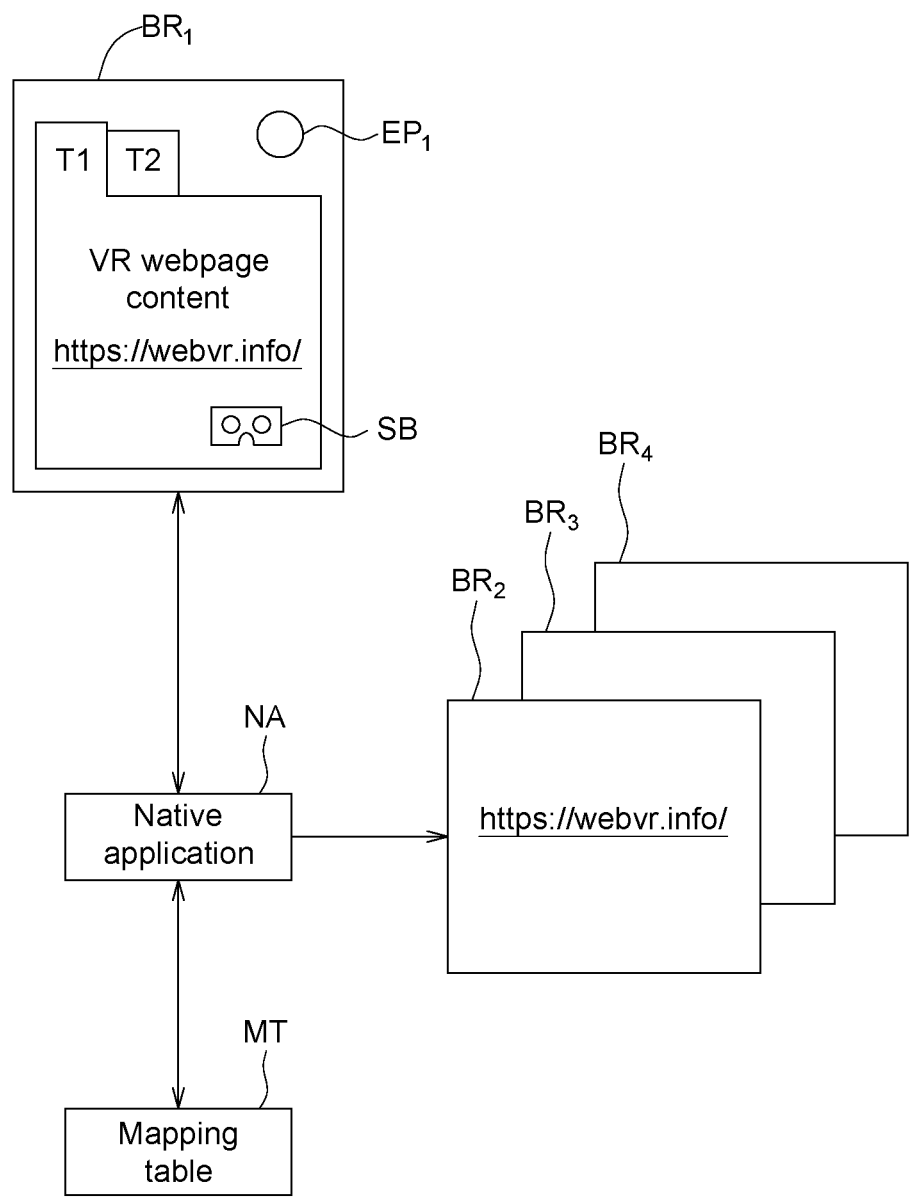
FIG. 3 is a scenario diagram of a method for browsing VR webpage content according to an embodiment of the present disclosure.
Figure 4:
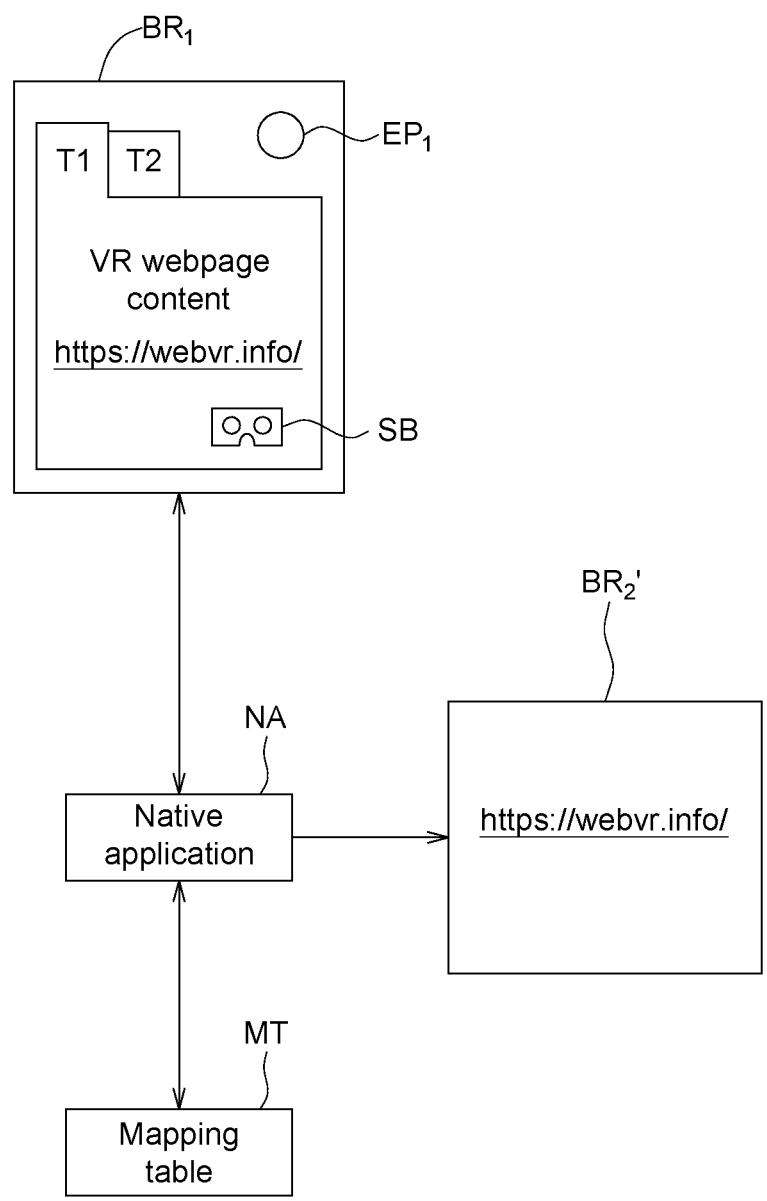
FIG. 4 is a scenario diagram of a method for browsing VR webpage content according to another embodiment of the present disclosure.

For the method for browsing VR webpage content of the present disclosure to be better understood, the browsing method is further described with the scenario diagrams in FIG. 3 and FIG. 4.

FIG. 3 is a scenario diagram of a method for browsing VR webpage content according to an embodiment of the present disclosure.

In the example of FIG. 3, a VR webpage (exemplified by the website https://webvr.infor/) is connected through a browser $BR_1$ by a user. In the window of the browser $BR_1$, a bookmark page T1 displays the VR webpage, but a bookmark page T2 is hidden behind the bookmark page T1. Besides, since the bookmark page T1 displays the VR webpage, the window of the bookmark page T1 can further display a reminder icon SB to remind the user to enter the VR webpage.

According to the example of FIG. 3, the extension component $EP_1$ is added in the browser $BR_1$. When the user browses the VR webpage by the browser $BR_1$, the browser $BR_1$ triggers a VR display event to notify the extension component $EP_1$. In response to the notification of the browser $BR_1$, the extension component $EP_1$ displays an inquiry window to inquire whether the user wants to enter a VR immersive mode to view the VR content of the VR webpage. If the user chooses to enter the VR immersive mode, the extension component $EP_1$ retrieves webpage information of the VR webpage and provides the webpage information of the VR webpage to the native application NA. Conversely, if the user chooses not to enter the VR immersive mode, the extension component $EP_1$ does not perform any action and the related operation continues to be performed through the browser $BR_1$.

In an embodiment, the extension component $EP_1$ can omit the step of displaying the inquiry window. Instead, after receiving the notification message from the browser $BR_1$, the extension component $EP_1$ directly retrieves webpage information of the VR webpage and provides the webpage information of the VR webpage to the native application NA.

The native application NA can detect the device information of the VR helmet 13 and find out the browser, which supports the VR helmet 13, from the mapping table MT according to device information. For example, the native application NA determines, according to the information of the mapping table MT, that the browser $BR_2$ of the browsers $BR_1 \sim BR_4$ installed on the platform 102 supports the VR helmet 13 to display the VR webpage content.

When the native application NA determines that the current browser $BR_1$ does not support the VR helmet 13, the native application NA automatically opens a browser, which supports the VR helmet 13 (such as browser $BR_2$), according to the above determination, and provides the webpage information retrieved by the extension component $EP_1$ to the browser $BR_2$, such that the user can browse the VR webpage through the browser $BR_2$ which can show the VR content of the VR webpage.

In an embodiment, when the native application NA determines that the current browser $BR_1$ does not support the VR helmet 13 and cannot find out the browser, which can support the VR helmet 13, from the mapping table MT, the native application NA display a message to inform the user that currently no browsers which support the VR helmet 13 are installed on the platform 102. The native application NA can further display suggestion information for the user's reference regarding which browsers currently supporting the VR helmet 13.

During the period in which the user browses the VR webpage through the browser $BR_2$, a monitoring program installed on the platform 102 monitors whether the browser $BR_2$ is closed and whether the VR helmet 13 is in a un-use status of being turned off or in a sleep mode. When the above status are detected (that is, the browse suspending condition is satisfied), the monitoring program hides the frame of the browser $BR_2$ or closes the browser $BR_2$, and restores the frame of the browser $BR_1$ originally used by the user to the foreground, so that the user can use his/her familiar browser again.

FIG. 4 is a scenario diagram of a method for browsing VR webpage content according to another embodiment of the present disclosure. The present embodiment is different from above embodiments in that the platform 102 of the present embodiment includes a browser $BR_2'$ which can be, for example, a Chromium browser or other simple webpage browser. Developers can make the browser $BR_2'$ have built-in various drive parameters (such as the device source codes released by the manufacturer of the VR helmet) for various VR helmets to support various VR helmets to browse the VR content of the VR webpage. Through the browser $BR_2'$, once the native application NA determines that the current browser (such as browser $BR_1$) does not support the VR helmet 13, the native application NA directly opens the VR webpage by the browser $BR_2'$. The browser $BR_2'$ can be implemented by a simple VR webpage browser and therefore occupies fewer system resources. The user only needs to install his/her familiar browser and the browser $BR_2'$ on the platform 103 and the browsers will support various VR helmets available in the market.

To summarize, the present disclosure provides a method for browsing VR webpage content and an electronic device using the same. According to the browsing method and the electronic device using the same of the present disclosure, the user's VR helmet type is automatically detected, and the browsers supported by the VR helmet are automatically found out. When it is determined that the user's browser does not support the VR helmet to display the VR content of the VR webpage, the VR content is automatically switched to be displayed by the browser which supports the VR helmet. Thus, even the user does not know what browsers his/her VR helmet can support or is not familiar with the operation of the browsers supported by the VR helmet, the user still can conveniently browse the VR webpage content by using his/her familiar browser.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for browsing virtual reality (VR) webpage content, wherein the browsing method is performed by an electronic device comprising a processor, the method comprises:
   identifying device information of a VR helmet by a native application;
   sending out a notification message by a first browser when it is detected that a VR webpage is browsed;
   retrieving webpage information corresponding to the VR webpage and providing the webpage information to the native application by an extension component of the first browser in response to the notification message;
   determining, by the native application, whether the first browser supports the VR helmet to display a VR content of the VR webpage according to the device information; and
   opening the VR webpage through a second browser by the native application according to the webpage information when it is determined that the first browser does not support the VR helmet to display the VR content of the VR webpage, wherein the second browser supports the VR helmet to display the VR content of the VR webpage;
   monitoring, by a monitoring program, whether the state of the VR helmet satisfies a browse suspending condition during the period in which the VR webpage is browsed by the second browser; and
   restoring the frame of the first browser to the foreground by the native application when the browse suspending condition is satisfied.

2. The browsing method according to claim 1, further comprising:
   obtaining a mapping table by the native application, wherein the mapping table indicates a plurality of VR helmet types supported by various browsers on different platforms;
   comparing the device information of the VR helmet with the mapping table by the native application to find out the second browser which supports the VR helmet from the mapping table.

3. The browsing method according to claim 1, further comprising:
   continuing to browse the VR webpage through the first browser by the native application when it is determined that the first browser supports the VR helmet to display the VR content of the VR webpage.

4. The browsing method according to claim 1, further comprising:
   displaying an operable inquiry window on the frame of monitor to inquire whether a user enters a VR immersive operation by the extension component in response to the notification message; and
   providing the webpage information to the native application by the extension component in response to a confirmation operation of the inquiry window.

5. The browsing method according to claim 1, further comprising:
   registering a VR display event in the first browser by the extension component.

6. The browsing method according to claim 1, further comprising:
   registering the native application and the extension component in a platform to allow the extension component to retrieve the webpage information of the VR webpage and provide the webpage information to the native application.

7. The browsing method according to claim 1, wherein the device information comprises a product ID and a vendor ID of the VR helmet.

8. The browsing method according to claim 1, wherein the webpage information comprises a website and a webpage content of the VR webpage.

9. The browsing method according to claim 1, wherein the second browser has a plurality of built-in drive parameters of the VR helmet device.

10. An electronic device, comprising:
    a memory used for storing at least one instruction; and
    a processor coupled to the memory for executing the at least one instruction for:
    identifying device information of a VR helmet by a native application;
    sending out a notification message by a first browser when it is detected that a VR webpage is browsed;
    retrieving webpage information corresponding to the VR webpage and providing the webpage information to the native application by an extension component of the first browser in response to the notification message;
    determining, by the native application, whether the first browser supports the VR helmet to display a VR content of the VR webpage according to the device information;
    opening the VR webpage through a second browser by the native application according to the webpage information when it is determined that the first browser does not support the VR helmet to display the VR content of the VR webpage, wherein the second browser supports the VR helmet to display the VR content of the VR webpage;

monitoring, by a monitoring program, whether the state of the VR helmet satisfies a browse suspending condition during the period in which the VR webpage is browsed by the second browser; and restoring the frame of the first browser to the foreground by the native application when the browse suspending condition is satisfied.

11. The electronic device according to claim 10, wherein the processor is further adapted for:

obtaining a mapping table by the native application, wherein the mapping table indicates a plurality of VR helmet types supported by various browsers on different platforms;

comparing the device information of the VR helmet with the mapping table by the native application to find out the second browser which supports the VR helmet from the mapping table.

12. The electronic device according to claim 10, wherein the processor is further adapted for:

continuing to browse the VR webpage through the first browser by the native application when it is determined that the first browser supports the VR helmet to display the VR content of the VR webpage.

13. The electronic device according to claim 10, wherein the processor is further adapted for:

displaying an operable inquiry window on the frame of monitor to inquire whether a user enters a VR immersive operation by the extension component in response to the notification message; and providing the webpage information to the native application by the extension component in response to a confirmation operation of the inquiry window.

14. The electronic device according to claim 10, wherein the processor is further adapted for:

registering a VR display event in the first browser by the extension component.

15. The electronic device according to claim 10, wherein the processor is further adapted for:

registering the native application and the extension component in a platform to allow the extension component to retrieve the webpage information of the VR webpage and provide the webpage information to the native application.

16. The electronic device according to claim 10, wherein the device information comprises a product ID and a vendor ID of the VR helmet.

17. The electronic device according to claim 10, wherein the webpage information comprises a website and a webpage content of the VR webpage.

18. The electronic device according to claim 10, wherein the second browser has a plurality of built-in drive parameters of the VR helmet device.

* * * * *